United States Patent Office 3,355,315
Patented Nov. 28, 1967

3,355,315
PROCESS FOR TREATING OILY SURFACES
WITH POLYEPOXIDE COMPOSITIONS
Robert M. Jorda and Thomas J. Robichaux, Houston, and Noyes D. Smith, Jr., Bellair, Tex., assignors to Shell Oil Company, New York, N.Y., a corporation of Delaware
No Drawing. Filed Sept. 27, 1962, Ser. No. 226,754
1 Claim. (Cl. 117—97)

This invention relates to a new process for treating oily surfaces and to the resulting products. More particularly, the invention relates to a new process for treating metal surfaces coated with oil so as to inhibit disposition thereon of various materials such as paraffins and the like, and to the improved products prepared thereby.

Specifically, the invention provides a new and highly efficient process for treating metal surfaces coated with oil, and preferably the interior surfaces of metaly tubes and pipes, such as used in the oil production industry, to inhibit the disposition of various materials, such as paraffins, and to prevent corrosion. This process comprises treating the oily surfaces with a polyepoxide having more than one vic-epoxy group, and preferably a glycidyl polyether of polyhydric phenol, and more than an equivalent amount of a compound possessing a plurality of amino hydrogen atoms and preferably a cycloaliphatic polyamine, and allowing the coating on the metal surfaces to cure. The invention further provides new and improved products prepared by this process.

As a special embodiment, the invention provides a new process for treating interior surfaces of metal conduits which have been coated with oil, such as in the case of tubes and pipes used in the recovery and transportation of oil, to inhibit paraffin disposition which comprises pumping or otherwise passing a solution containing a compound possessing a plurality of amino hydrogen atoms into and through the metal pipe or tube, and then pumping or otherwise passing a solution of polyepoxide into and through the metal pipe and then allowing the coating remaining on the interior surface of the pipe or tube to cure. Alternatively, the polyepoxide and compound containing the amino hydrogen atom can be premixed and the mixture introduced into and through the metal pipe and the coating remaining on the surface allowed to cure.

Petroleum recovered from the ground in many cases contains a high percent of paraffin. As the oil is drawn through the tubes and pipes, there is a tendency of the paraffinic material to adhere to the oily surface of the metal conduits, and as a result the passageway is restricted. In some cases, the production rate becomes so low that the conduits have to be cleaned out before operations can be continued. It is highly desirable to find a way to inhibit the disposition of the paraffinic material on the surface of the tubes and pipes.

In addition, as the metal pipes and tubes are in contact with water wetted formations there is always a corrosion problem which interferes with efficient operation and adds to the cost of operation and maintenance.

It is an object of the invention, therefore, to provide a new process for treating oily surfaces. It is a further object to provide a new process for treating metal surfaces coated with oil, to prevent disposition of paraffins thereto. It is a further object to provide a new process for treating the interior of metal tubes and pipes used in the recovery and transportation of oil. It is a further object to provide a new process for treating the interior of metal tubes and pipes used in the oil industry so as to give improved protection against corrosion. These and other objects of the invention will be apparent from the following detailed description thereof.

It has now been discovered that these and other objects may be accomplished by the process of the invention comprising treating the oily surface with a polyepoxide having more than one vic-epoxy group and preferably a glycidyl polyether of a polyhydric phenol, and a compound possessing a plurality of amino hydrogen atoms and preferably a cycloaliphatic polyamine and allowing the coating on the surface to cure. In the case of interior surfaces of metal conduits, it is preferred to pump a solution containing the compound possessing the amino hydrogen atoms into and through the metal conduit and then passing a solution containing a polyepoxide into and through the metal conduit and allowing the coating which remains on the surface to cure. It has been found that by the use of the above techniques one can easily coat the oily metal surface of various tubes and pipes so as to give a strong adhesive coating which suprisingly inhibits the disposition of detrimental materials such as paraffins. This was quite unexpected as it was thought that the paraffins would adhere to the coated surface as well as metal surface. In addition, the new technique provides a coating for the metal which is very hard and tough and has excellent resistance to corrosion.

The polyepoxides to be used in preparing the compositions of the present invention include those compounds possessing more than 1 vic-epoxy group, i.e., a

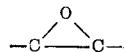

group. These polyepoxides may be saturated or unsaturated, aliphatic, cycloaliphatic, aromatic or heterocyclic and may be substituted if desired with non-interfering substitutents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl cleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsautrated monohydric alcohols and polycarboxylic acids, such as, for example, soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl)-adipate, di(2,3 - epoxybutyl)oxalate, di(2,3-epoxyhexyl)-succinate, di(3,4-epoxybutyl)maleate, di(2,3-epoxyoctyl)-pimelate, di(2,3 - epoxybutyl)phthalate, di(2,3-epoxyoctyl)tetrahydrophthalate, di(4,5-epoxydodecyl)maleate, di-(2,3 - epoxybutyl)terephthalate, di(2,3-epoxypentyl)thio-dipropionate, di(5,6-epoxytetradecyl)diphenyldicarboxyl-ate, di(3,4-epoxyheptyl)sulfonyldibutyrate, tri(2,3-epoxy-butyl)1,2,4 - butanetricarboxylate, di(5,6-epoxypentadecyl)tartarate, di(4,5 - epoxytetradecyl)maleate, di(2,3-epoxybutyl)azelate, di(3,4 - epoxybutyl)citrate, di(5,6-epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as 2,3-epoxybutyl 3,4-epoxypentanoate; 3,4 - epoxyhexyl 3,4-epoxypentanoate; 3,4-epoxycyclohexyl 3,4-epoxycyclohexanoate; 3,4-epoxycyclohexyl 4,5 - epoxyoctanoate; 2,3 - epoxycyclohexyl methyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanedioate; dibutyl 7,8,11,12-diepoxyoctadecanedioate; dioctyl 10,11-diethyl-8,9,12,13-diepoxy - eicosanedioate; dihexyl 6,7,10,11-diepoxyhexadecanedioate; didecyl 9 - epoxy-ethyl-10,11-epoxyoctadecanedioate; dibutyl 3 - butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epicholorhydrin with the desired polyhydric phenols in the presence of alkali. Polyester A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value 0.514 eq./100 g.) and the like and mixtures thereof.

Other examples of the glycidyl ethers include the glycidyl ethers of novolac resins which resins are obtained by condensing an aldehyde with phenol. A typical member of this class is the epoxy resin from a condensate of formaldehyde and 2,2 - bis(4 - hydroxyphenyl)propane novolac resin.

The glycidyl polyethers of polyhydric phenols obtained by condensing the polyhydric phenols with epichlorohydrin are also referred to as "ethoxylene" resins. See Chemical Week, Vol. 69, page 27, for September 8, 1951.

Of particular value in the process of the invention are the polyepoxides containing only carbon, hydrogen, oxygen and halogen atoms.

The other materials to be used in the process of the invention comprise compounds which possess a plurality of amino hydrogen atoms, i.e., a plurality of $$-\underset{|}{\overset{H}{N}}-$$

groups wherein N is an amino nitrogen. These include the aliphatic, cycloaliphatic, aromatic or cyclic amino as well as derivatives thereof as well as the derivative still condensing the necessary amino hydrogen.

Examples of these materials include, among others, the aliphatic polyamines, such as, for example, ethylene diamine, diethylene triamine, triethylene tetramine, tetraethylene pentamine, 1,4 - aminobutane, 1,3 - diaminobutane, hexamethylene diamine, 3 - (n - isopropylamino) propylamine, N,N' - diethyl - 1,3-propanediamine, hexapropylene heptamine, penta(1 - methyl - propylene)hexamine, tetrabutylenepentamine, hexa - (1,1-dimethylethylene) - heptamine, di(1 - methylbutylene)triamine, pentaamylhexamine, tri(1,2,2 - trimethylethylene)tetramine, tetra(1,3 - dimethylpropylene)pentamine, penta(1,5 - dimethylamylene)hexamine, penta - 1,2 - dimethyl - 1 - isopropylethylene)hexamine and N,N' - dibutyl - 1,6 - hexanediamine.

Aliphatic polyamines coming under special consideration are the alkylene polyamines of the formula $$H_2N(RNH)_nH$$

wherein R is an alkylene radical, or a hydrocarbon substituted alkylene radical, and $n$ is an integer of at least one, therebeing np upper limit to the number of alkylene groups in the molecule.

Especially preferred aliphatic polyamines comprise the polyethylene polyamines of the formula

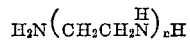

wherein $n$ is an integer varying from about 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine and having related higher polymers which increase in complexity with increasing molecular weights. The remaining 80–20% of the mixture is diethylene triamine employed in such proportions that the mixture is fluid at about room temperature (60–90° F.).

The mixture of high molecular weight polyethylene polyamines is normally obtained as a bottom product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% diethylene triamine has the following analysis:

| | Percent by weight |
|---|---|
| Carbon | 51.5 |
| Nitrogen | 34.3 |
| Hydrogen | 11.6 |
| Oxygen | 2.5 | total basicity, equivalents per 100 grams=1.98, equivalent to 27.7% nitrogen.

| | | |
|---|---|---|
| Active nitrogen | percent | 81 |
| Viscosity | poises | 75–250 |
| Equivalent weight | percent | 42.5 to 47.5 |

This mixture of polyamines will be referred to hereinafter as Polyamine H.

Other examples include the polyamines possessing cycloaliphatic ring or rings, such as, for example, 1 - cyclohexylamino - 3 - aminopropane, 1,4 - diaminocyclohexane, 1,3 - diaminocyclopentane, di(aminocyclohexyl)methane, di(aminocyclohexyl)sulfone, 1,3 - di(aminocyclohexyl) propane, 4 - isopropyl - 1,2 - diaminocyclohexane, 2,4-diaminocyclohexane, N,N'diethyl - 1,4 - diaminocyclohexane, and the like. Preferred members of this group comprise those polyamines having at least one amino or alkyl-substituted amino group attached directly to a cycloaliphatic ring containing from 5 to 7 carbon atoms. These cycloaliphatic amines are preferably obtained by hydrogenating the corresponding aromatics amine. Thus di(aminocyclohexyl)methane is obtained by hydrogenating methylene dianiline.

Another group of materials that may be used in process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkoxysilylpropylamines as triethoxysilylpropylamines.

Still another group comprise the aminoalkyl-substituted aromatic compounds, such as, for example, di(aminoethyl)benzene, di(aminomethyl)benzene, tri(aminoethyl)benzene, tri(aminobutyl)naphthalene and the like.

Still another group comprise the polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N-aminoisopropyl - 3 - butoxypiperazine, N - aminoethylpiperazine, 2,5-dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide-polyamine reaction products include, among others, N(hydroxypropyl) diethylene triamine (reaction product of propylene oxide and diethylene triamine) and N(2-hydroxy-4-phenoxypropyl) diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use in the compositions of the present invention. Examples of the monoamines include, among others, secondary amines as dimethylamine, diethylamine, dipropylamine, dibutylamine, di(tertbutyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Another group of derivatives that may be used in the process of the invention include those soluble and fusible products obtained by reacting the polyamines noted above with unsaturated nitriles, such as, acrylonitrile. Examples of such products include the cyanoethylated diethylene triamine, cyanoethylated triethylene tetramine, cyanoethylated hexamethylene diamine, cyanoethylated 1,3-propanediamine and cyanoethylated 1,3-diaminocyclohexane. Preferred species of the cyanoalkylated polyamines include those of the formula

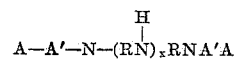

wherein $x$ represents an integer in the range of 0 through 3 and A and A′ represent a member selected from the group consisting of hydrogen and cyanoethyl radicals, and further characterized in that the amine has at least one cyanoethyl group and at least one non-tertiary amino group in the molecule. Especially preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula

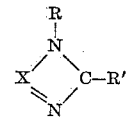

wherein X is an organic radical, and preferably an alkylene radical, R′ is a long chain hydrocarbon radical, and preferably one containing at least 12 carbon atoms, and R is an organic radical containing an amine or amine substituted group. Particularly preferred members of this group are those obtained by reacting any of the above-described polyamines with long chain monocarboxylic acids, such as those containing at least 12 and preferably 16 to 30 carbon atoms, such as, for example, palmitic acid, pentadecanoic acid, 4-ketomyristic acid, 8,10-dibromostearic acid, margaric acid, stearic acid, alpha-chlorostearic acid, linoleic acid, oleic acid, dihydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about .3 to .7 to 1, and preferably about .3 to .5 to 1. The temperature employed preferably varies from about 100° C. to 250° C.

Still other examples include the sulfur and/or phosphorous-containing polyamines, such as may be obtained by reacting a mercaptan or phosphine containing active hydrogen with an epoxy halide to form a halohydrin, dehydrochlorinating and then reacting the resulting compound with a polyamine. N-(3-ethylthio-2-hydroxypropyl) diethylene triamine may be prepared, for example, by reacting ethyl mercaptan with epichlorohydrin, dehydrochlorinating and then reacting the resulting epoxy compound with diethylene triamine. Suitable examples of such compounds include, among others, N-(3-butylthio-2-hydroxypropyl) triethylene tetramine, N-(4-phenylthio-3-hydroxybutyl) pentamethylene tetramine, N-(4-cyclohexylthio-3-hydroxybutyl)ethylene diamine, N-(3-cyclohexylthio-2-hydroxypropyl)hexamethylene diamine, N-(3-diphenylphosphino-2-hydroxypropyl)triethylene tetramine, N-(3-dicyclohexylphosphino - 2 - hydroxypropyl)pentamethylene tetramine, N-(3-didodecylphosphino-3-hydroxyhexyl)diethylene triamine, and 3-(allylthio-2-hydroxypropyl) hexamethylene diamine. Coming under special consideration are the N(alkylthiohydroxyalkyl) aliphatic and aromatic polyamines, the N-(cycloalkylthiohydroxyalkyl) aliphatic and aromatic polyamines and the N-(arylthiohydroxyalkyl) aliphatic and aromatic polyamines. Preferred phosphorous-containing curing agents include the N-(dialkylphosphinohydroxyalkyl) aliphatic and aromatic polyamines, the N-(dicycloalkylphosphinohydroxyalkyl) aliphatic and aromatic polyamines, and the N-(diarylphosphinohydroxyalkyl) aliphatic and aromatic polyamines.

Still other derivatives that may be employed include those obtained by reacting the polyamines with acrylates, such as methyl acrylate, ethyl acrylate, methyl methacrylate and the like. In this case there is an exchange of the ester linkage for an amide linkage, one of the polyamine nitrogen being involved in the said amide linkage.

Particularly preferred polyamines and derivatives to be used with the above-described polyepoxides comprise the aliphatic and cycloaliphatic polyamines of the formula

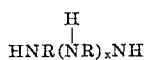

wherein $x$ is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acids containing up to 20 carbon atoms.

Other materials may be included in the coating composition of the present invention. These include, for example, various types of pigments, plasticizers, stabilizers, fungicides, insecticides, and various activators for the above-described compounds containing amino hydrogen such as, for example, phenols, acids, salts, thiols sulfides, and the like and mixtures thereof. Other materials which may be added include extenders such as various types of tars, pitches, asphalts, synthetic resins, and the like. The proportion of these additional materials employed will depend upon the intended use and the techniques to be employed as described hereinafter.

The polyepoxide and compound containing amino hydrogen are applied in liquid form. In the coating of the interior surface of metal conduits, it is also desirable that these materials be in a very fluid state so that they may be easily pumped or otherwise circulated. Many of the polyepoxides and compounds containing amino hydrogen are already in that form and my be used as such. In other cases, it may be desirable to employ a fluid solvent or diluent with one or more of the components. Examples of such materials include, among others, kerosene extracts, benzene, toluene, cyclohexane, alkanes from 5 to 10 carbon atoms, ketones, esters, such as methyl Cellosolve acetate, glycols, such as diethylene glycol, chlorinated hydrocarbons, such as trichloropropane, diethyl phehalate, dioctyl phthalate, monoepoxy compounds, such as butyl glycidyl ether, phenyl glycidyl ether and the like. When the materials are to be utilized under conditions where the temperatures may be relatively high, as when the compositions are to be injected into wells of considerable depth, it is preferred to use the higher boiling materials, such as the kerosene extracts.

The proportions of the polyepoxides and the compound having an amino hydrogen used in the process of the invention should be maintained within controlled range. One should employ more than one equivalent of the compound possessing the amino hydrogen per equivalent of polyepoxide. As used herein and in the appended claim, the chemically equivalent amount refers to that amount needed to furnish one amino hydrogen for every epoxy group to be reacted. Particularly superior results are obtained when the compound containing amino hydrogen is employed in an amount ranging from about 1.05 equivalents to 1.5 equivalents per equivalent of polyepoxide, and still more preferably from 1.1 to 1.4 equivalents per equivalent of polyepoxide.

The method used for the application of the above-described compounds to the metal surface may be varied. According to the conditions at hand, for example, the polyepoxide and the compound containing the amino hydrogen may be mixed together prior to their application to the metal surfaces. It is generally preferred, however, and particularly improved results are obtained by using special technique of first applying a solution containing the compound having the amino hydrogen, then applying the solution containing the polyepoxide, and then allowing the coating that remains to cure.

Particularly superior results are obtained by using the special method of (1) contacting the metal surface with liquid aliphatic and aromatic hydrocarbons containing as solutes the polyepoxide and the compound possessing a plurality of amino hydrogen so as to form on the metal surface a layer of liquid that comprises a solution of said solutes in a mixture of aliphatic and aromatic hydrocarbons, (2) freeing said layer of liquid from contact with the liquid portion in which the solutes are mutually miscible by displacing the free-flowing portions of said hydrocarbons with a fluid (liquid or gas) of relatively low mutual miscibility with the solutes, and (3) maintaining the resulting layer of liquid in contact with the metal and the fluid of relatively low mutual miscibility with said solutes to coat the metal with the product of reaction of the solutes.

Step 1 of the above-described procedure should be accomplished, for example, by contacting as by dipping the metal surface first with a solution of amine curing agent in an aromatic hydrocarbon solvent and then contacting as by dipping the resulting surface with a solution of polyepoxide in a mixture of aliphatic and aromatic solvent. Step 2 can, for example, be accomplished by draining the metal surface treated as in the preceding sentence so as to drain off the free flowing portion of the coating and displace it with air. Step 3 can then be accomplished by allowing the surface coated with the more viscous mixture containing the solutes to set until the solutes have reacted to form the insoluble infusible coating on the metal surface.

The technique of application may also be varied according to the circumstances. As the oily metal surface is available for coating the materials may be applied by brushing, dipping or spraying or other suitable techniques. In the case of applying the compositions to the interior surface of metal tubes or pipes, it is highly desirable to pump or otherwise pass the composition into and through the conduit so as to apply a layer of the solution to the interior surface of the tube or pipe. This technique is particularly desirable in the case of tubing or pipes used in the oil recovery or transportation industry.

While the application can be made to surfaces which are free of oil, the superior results are particularly evident when the application is made to surfaces coated with oil and can be made directly on the oily surface. If the layer of the oil on the surface is too thick it may be desirable to remove some of it by application of solvents and the like before the compositions of the invention are applied. Particularly superior results are obtained when the coating of oil on the surface is not more than a few mils thick.

The thickness of the coating of the composition of the invention on the surface would depend upon the particular need of that application. The coating may, for example, vary from just a few mils thick up to as high or higher than an eighth of an inch thickness. The thickness of the coating may be controlled by either controlling the viscosity of the solutions applied or by repeated applications.

After the material has been applied to form the desired coating, the coating is then allowed to set until it has become cured to the insoluble infusible state, e.g., is insoluble in acetone and does not soften when heated say to 100° C. The curing takes place in normal temperatures so no external steps need be taken to effect the cure. Heat, of course, will speed the cure and if the composition is applied to tubes and pipes in oil wells which are of considerable depth and where the temperature may be in a higher range the cure of the coating will take place at a faster rate. Under normal application conditions, the coating will generally harden by being allowed to set for several hours at ambient temperature.

The process of the invention is particularly adapted for the use in the coating of tubes and pipes used in the recovery and transportation of oil. In case of an oil well, it is general procedure to pump into the production string installed in casing of the oil well the desired solution or solutions and then remove the solutions and allow the coating to set for a few hours to harden. At the end of that time the oil wells can then again be put into production. Process is particularly suitable for the treatment of tubes and pipes used in off-shore drilling as the coating also imparts improved corrosion resistance thereto. Further advantage is also found in the fact that the coating also tends to repair defects such as cracks and breaks in the tubing.

The process of the invention may be used for the coating of any metal surface. This includes surfaces made up of metals such as iron, steel, copper, aluminum, brass, and the like. The process has shown particularly superior results when used for the treatment of ferruginous metal surfaces. The surfaces may be in any type of structure such as, for example, tubes, pipes, pilings, well jackets, collection platforms, drilling platforms, and the like.

To illustrate the manner in which the invention may be carried out the following examples are given. It is to be understood, however, that the examples are for the purpose of illustration and the invention is not to be regarded as limited to any of the specific materials or conditions recited therein.

*Example I*

This example illustrates the superior results obtained by use of the process of the invention as to inhibiting paraffin deposition on metal surfaces.

Treating solution A was prepared by dissolving 27.8 parts of a glycidyl polyether of 2,2-bis(4-hydroxyphenyl)propane (Polyether A described in U.S. 2,633,458) in 100 parts of an aromatic hydrocarbon solvent containing about 81% aromatics by volume and a boiling temperature between 370° F. and 510° F. Treating solution B was prepared by dissolving 11.3 parts of 1-cyclohexylamino-3-aminopropane and 1 part of phenol crystals in 50 parts of the aromatic hydrocarbon solvent described above.

Then strips of iron coated on the surface with a thin layer of oil were dipped in treating solution B, drained and then dipped in treating solution A. After a few minutes, the strips were removed, drained and allowed to dry in air. After several hours, the coating on the strips had set to a hard insoluble infusible film.

The above coated strips were cooled and paraffin was coated thereon. Strips of iron which had not been treated by the process noted above were also coated with paraffin under the same conditions. In case of the strips of iron treated according to the present invention, the paraffin had no adhesion and was easily removed. On the other hand, the paraffin had good adhesion to the plain iron strips of metal.

*Example II*

Example I was repeated with the exception that treating solutions A and B were pumped into the steel production string of an oil well of considerable depth which had been producing oil having a relatively high paraffin content. Treating solution B was first pumped into the well and then withdrawn and then treating solution A was pumped into the well and withdrawn. After capping the well for about 24 hours, production was again commenced. Examination after several weeks of operation indicated that there had been considerable decrease in the deposition of paraffins onto the wall of production string tube.

*Example III*

Examples I and II are repeated with the exception that the 1-cyclohexylamino-3-aminopropane is replaced with each of the following curing agents: N-aminoethyl-piperazine, propylene diamine, triethylene diamine, mixture of bis(4-aminocyclohexyl)methane and 1-cyclohexylamino-3-aminopropane, bis(3-methyl - 4 - aminocyclohexyl)methane and an adduct of diethylene triamine and ethylene oxide. Related results are obtained in each case.

*Example IV*

27.8 parts of a glycidyl polyether of 2,2-bis(4-hydroxyphenyl)propane (Polyether A described in U.S. 2,633,458) and 11.3 parts of 1-cyclohexylamino-3-aminopropane were added to 100 parts of the aromatic hydrocarbon solvent defined in Example I. About 25 parts of this solution was combined with 11.25 parts of diesel oil, 13.75 parts of the above-noted aromatic hydrocarbon solvent and 0.5 part of phenol crystals. The mixture was stirred and allowed to stand for .5 hour.

Strips of iron coated on the surface with a thin layer of oil were dipped into this solution and then withdrawn in a few minutes and allowed to drain. The coated strips were then allowed to stand at room temperature. In a few hours, the coating had set to a hard insoluble infusible coating.

These strips were also cooled and coated with paraffin as in Example I. The paraffin had no adhesion to such strips and was easily removed. On the other hand, as shown in Example I the paraffin had good adhesion to the plain iron strips which had been previously coated with the paraffin.

*Example V*

Example IV is repeated with the exception that the treating solution was pumped into the steel production string of an oil well of considerable depth, and then withdrawn. After capping the well for about 24 hours, production was again commenced. Examination after several weeks of operation indicated that there had been considerable decrease in the deposition of paraffins onto the wall of the production string tube.

*Example VI*

Examples I and II are repeated with the exception that the 1-cyclohexylamino-3-aminopropane is replaced with an equivalent amount of a polyamide of dimerized linoleic acid and diethylene amine having an amine value of 306. Related results are obtained.

*Example VII*

Example I is repeated with the exception that Polyether A is replaced with an 85–15 mixture of Polyether A and butyl glycidyl ether. Related results are obtained.

*Example VIII*

Examples I and V are also repeated with the exception that Polyether A is replaced with diglycidyl ether of resorcinol. Related results are also obtained.

*Example IX*

Example I is repeated with the exception that the iron strips were replaced with strips of copper and steel. Related results are obtained.

Example X

This example illustrates a preferred procedure for sequentially contacting metal surfaces with the amino and polyepoxy reactants of the present process. This example uses the solutions A and B of Example I.

A one foot section of one inch metal pipe is supported vertically and arranged so that fluids can be flowed in from the top and withdrawn from the bottom. The pipe is filled with fluids using enough of each fluid to fill the pipe, displacing each fluid from the pipe with the next fluid that is flowed into the pipe, and using the following sequence of fluids: potable water, isopropyl alcohol, solution B, nujol (or white oil), solution A, and air. After several hours, the coating on the pipe sets to a hard infusible film.

In this preferred procedure, the liquids containing the amino and polyepoxy reactants are separated by an inert liquid which is significantly but incompletely soluble in the liquid containing the amino reactants. Where the amino reactant is dissolved in a solvent, it is preferable to use a solvent which is more polar than the inert liquid. The use of the separation by means of an inert liquid insures that no reaction occurs between the resin-forming reactants until those reactants have been deposited in a layer on the surface to be coated. Such a sequence of individual liquids can be further used or reused until they are depleted of their active components due to adsorption on the surfaces contacted or until they become intermingled by diffusion and/or fingering.

The inert liquid used to separate the reactants should be significantly soluble in the liquid containing the compound having a plurality of amino hydrogen atoms at the ambient temperature of the treatment to the extent that the inert liquid does not finger through the reactant-containing liquid while it is displacing that liquid along the surfaces being treated. It should be incompletely soluble in that reactant-depositing liquid to the extent preventing the dissolving of substantially all of the reactant in the volume of inert liquid that contacts the surfaces being treated.

We claim as our invention:

A process for treating the interior surfaces of a conduit which comprises pumping through the conduit a volume of reactant-depositing liquid containing enough compound having a plurality of amino hydrogen atoms to leave a film of liquid containing that compound on the surfaces being treated; pumping through the conduit, immediately behind the reactant-depositing liquid, inert liquid having a significant but incomplete solubility in the reactant-depositing liquid, using a volume of inert liquid sufficient to maintain a separation between the reactant-depositing liquid and fluid pumped through the conduit behind the inert liquid; pumping through the conduit, immediately behind the inert liquid, a volume of liquid containing sufficient polyepoxide having more than one vic-epoxy group to contact substantially all of the film deposited by the reactant-depositing liquid.

References Cited

UNITED STATES PATENTS

| | | | |
|---|---|---|---|
| 2,862,836 | 12/1958 | Ooster Hout | 117—97 |
| 2,880,194 | 3/1959 | Glaser | 117—132 |
| 2,906,720 | 9/1959 | Simpson | 117—132 |
| 2,927,078 | 3/1960 | Nathan | 117—97 |
| 2,953,146 | 9/1960 | Gordon | 137—1 |
| 2,967,172 | 1/1961 | Hood | 117—132 |
| 2,981,701 | 4/1961 | St. Clair et al. | 117—161 |
| 3,119,711 | 1/1964 | Starmann et al. | 117—62.2 |

ALFRED L. LEAVITT, *Primary Examiner.*

RICHARD D. NEVIUS, *Examiner.*

A. H. ROSENSTEIN, *Assistant Examiner.*